(12) United States Patent
Giardino et al.

(10) Patent No.: US 11,040,314 B2
(45) Date of Patent: Jun. 22, 2021

(54) APPARATUSES, SYSTEMS, AND METHODS FOR INJECTING GASSES INTO BEVERAGES

(71) Applicant: Cornelius, Inc., Osseo, MN (US)

(72) Inventors: Nicholas Michael Giardino, South Elgin, IL (US); Michael Thomas Marszalek, Bolingbrook, IL (US); Jonathan Robert Wirkus, Saint Charles, IL (US)

(73) Assignee: MARMON FOODSERVICE TECHNOLOGIES, INC., Osseo, MN (US)

( * ) Notice: Subject to any disclaimer, the term of this patent is extended or adjusted under 35 U.S.C. 154(b) by 188 days.

(21) Appl. No.: 16/506,093

(22) Filed: Jul. 9, 2019

(65) Prior Publication Data

US 2020/0215498 A1 Jul. 9, 2020

Related U.S. Application Data

(60) Provisional application No. 62/839,024, filed on Apr. 26, 2019, provisional application No. 62/789,620, filed on Jan. 8, 2019.

(51) Int. Cl.
*B01F 3/04* (2006.01)
*B01F 5/04* (2006.01)
(Continued)

(52) U.S. Cl.
CPC .............. *B01F 3/0446* (2013.01); *A23L 2/54* (2013.01); *B01F 3/04787* (2013.01);
(Continued)

(58) Field of Classification Search
CPC ........ A23L 2/54; B01F 3/0446; B01F 5/0461; B01F 3/04787; B01F 3/04815; B67D 1/1252
See application file for complete search history.

(56) References Cited

U.S. PATENT DOCUMENTS 1,365,183 A 1/1921 Moffatt
1,561,036 A 11/1925 Sugden
(Continued)

FOREIGN PATENT DOCUMENTS

CA 2005959 6/1990
CN 1060073 4/1992
(Continued)

OTHER PUBLICATIONS

Fulcher How to Use the Soda Stream Jet YouTube Feb. 11, 2012 [retrieved on Feb. 26, 2014] Retrieved from the Internet: <URL:http:www.youtube.com/watch?v=bf9MVEel5XM> entire video, (8 pages).

(Continued)

*Primary Examiner* — Robert A Hopkins
(74) *Attorney, Agent, or Firm* — Andrus Intellectual Property Law, LLP

(57) ABSTRACT

In certain examples, a beverage dispenser includes a gas system configured to collect ambient air, pressurize the ambient air, and dispense the pressurized ambient air, a valve configured to dispense a base fluid, and a concentrate system configured to dispense a concentrate. A manifold is configured to form a gas-injected mixed beverage comprising the base fluid, the concentrate, and the pressurized ambient air, and a nozzle is configured to apply a backpressure upstream on the gas-injected mixed beverage and dispense the gas-injected mixed beverage.

21 Claims, 9 Drawing Sheets

(51) Int. Cl.
    *A23L 2/54*            (2006.01)
    *B67D 1/12*          (2006.01)

(52) U.S. Cl.
    CPC ........ *B01F 3/04815* (2013.01); *B01F 5/0461* (2013.01); *B67D 1/1252* (2013.01); *B01F 2003/04872* (2013.01); *B01F 2215/0022* (2013.01); *B67D 2001/1254* (2013.01)

(56) References Cited

U.S. PATENT DOCUMENTS

| | | |
|---|---|---|
| 1,960,640 A | 5/1934 | Lajeunesse |
| 2,006,313 A | 6/1935 | Geddes |
| 2,170,531 A | 8/1939 | Kahn |
| 2,209,054 A | 7/1940 | Doud et al. |
| 2,556,038 A | 6/1951 | Kollsman |
| 2,620,107 A | 12/1952 | Tolan |
| 3,113,871 A | 12/1963 | Webster |
| 3,417,974 A | 11/1966 | Glynn |
| 3,397,871 A | 8/1968 | Hasselberg |
| 3,545,731 A | 12/1970 | McManus |
| 3,582,351 A | 6/1971 | Austin et al. |
| 3,617,032 A | 11/1971 | Tracy |
| 3,780,198 A | 12/1973 | Pahl et al. |
| 3,911,064 A | 10/1975 | McWhirter |
| 4,124,049 A | 11/1978 | Yamaguchi |
| 4,171,580 A | 10/1979 | Vabrinskas |
| 4,181,604 A | 1/1980 | Onishi et al. |
| 4,208,903 A | 6/1980 | Hopper et al. |
| 4,251,473 A | 2/1981 | Gilbey |
| 4,259,360 A | 3/1981 | Venetucci et al. |
| 4,268,279 A | 5/1981 | Shindo et al. |
| 4,323,090 A | 4/1982 | Magi |
| 4,364,493 A | 12/1982 | Raynes et al. |
| 4,466,342 A | 8/1984 | Basile et al. |
| 4,481,986 A | 11/1984 | Meyers |
| 4,517,135 A | 5/1985 | Szerenyi et al. |
| 4,518,541 A | 5/1985 | Harris |
| 4,526,298 A | 7/1985 | Boxer et al. |
| 4,573,967 A | 3/1986 | Hargrove et al. |
| 4,583,969 A | 4/1986 | Mortensen |
| 4,610,888 A | 9/1986 | Teng et al. |
| 4,668,219 A | 5/1987 | Israel |
| 4,674,958 A | 6/1987 | Igarashi et al. |
| 4,681,244 A | 7/1987 | Geddie |
| 4,708,827 A | 11/1987 | McMillin |
| 4,709,625 A | 12/1987 | Layre et al. |
| 4,719,056 A | 1/1988 | Scott |
| 4,739,905 A | 4/1988 | Nelson |
| 4,759,474 A | 7/1988 | Regunathan et al. |
| 4,781,889 A | 11/1988 | Fukasawa et al. |
| 4,785,973 A | 11/1988 | Kobe |
| 4,808,346 A | 2/1989 | Strenger |
| 4,808,348 A | 2/1989 | Rudick et al. |
| 4,815,635 A | 3/1989 | Porter |
| 4,818,447 A | 4/1989 | Kiyomoto Tekko et al. |
| 4,820,269 A | 4/1989 | Riddell |
| 4,850,269 A | 7/1989 | Hancock et al. |
| 4,857,350 A | 8/1989 | Kiyomoto Tekko et al. |
| 4,869,396 A | 9/1989 | Horino et al. |
| 4,897,359 A | 1/1990 | Oakley et al. |
| 4,923,379 A | 5/1990 | Tomminen |
| 4,927,335 A | 5/1990 | Pensa |
| 4,927,567 A | 5/1990 | Rudick |
| 4,940,212 A | 7/1990 | Burton |
| 4,950,431 A | 8/1990 | Rudick et al. |
| 4,959,152 A | 9/1990 | Nichols |
| 4,961,760 A | 10/1990 | Caskey et al. |
| 4,971,836 A | 11/1990 | Fukasawa et al. |
| 4,976,894 A | 12/1990 | Robinson |
| 4,999,140 A | 3/1991 | Sutherland et al. |
| 5,029,733 A | 7/1991 | Hedderick et al. |
| 5,034,164 A | 7/1991 | Semmens |
| 5,037,610 A | 8/1991 | Fukasawa et al. |
| 5,038,976 A | 8/1991 | McMillin |
| 5,044,171 A | 9/1991 | Farkas |
| 5,059,374 A | 10/1991 | Krueger et al. |
| 5,060,833 A | 10/1991 | Edison et al. |
| 5,062,548 A | 11/1991 | Hedderick et al. |
| 5,073,811 A | 12/1991 | Botti et al. |
| 5,104,158 A | 4/1992 | Meyer et al. |
| 5,118,009 A | 6/1992 | Novitsky |
| 5,124,088 A | 6/1992 | Stumphauzer |
| 5,152,419 A | 10/1992 | Yanagi |
| 5,156,871 A | 10/1992 | Goulet et al. |
| 5,192,513 A | 3/1993 | Stumphauzer et al. |
| 5,222,308 A | 6/1993 | Barker et al. |
| 5,232,601 A | 8/1993 | Chu et al. |
| 5,254,143 A | 10/1993 | Anazawa et al. |
| 5,260,081 A | 11/1993 | Stumphauzer et al. |
| 5,287,636 A | 2/1994 | Lafleur et al. |
| 5,294,338 A | 3/1994 | Kamo et al. |
| 5,299,715 A | 4/1994 | Feldman |
| 5,304,130 A | 4/1994 | Button et al. |
| 5,306,242 A | 4/1994 | Joyce et al. |
| 5,353,963 A | 10/1994 | Gorski |
| 5,358,142 A | 10/1994 | Holmes |
| 5,366,625 A | 11/1994 | Pedersen et al. |
| 5,380,433 A | 1/1995 | Etienne et al. |
| 5,419,461 A | 5/1995 | Goulet |
| 5,460,846 A | 10/1995 | Stumphauzer et al. |
| 5,509,349 A | 4/1996 | Anderson et al. |
| 5,510,194 A | 4/1996 | Hendricks et al. |
| 5,515,687 A | 5/1996 | Arriulou |
| 5,531,254 A | 7/1996 | Rosenbach |
| 5,549,037 A | 8/1996 | Stumphauzer et al. |
| 5,565,149 A | 10/1996 | Page et al. |
| 5,588,984 A | 12/1996 | Verini |
| 5,592,867 A | 1/1997 | Walsh et al. |
| 5,634,571 A | 6/1997 | Cataneo et al. |
| D384,731 S | 10/1997 | Ramacier, Jr. et al. |
| 5,674,433 A | 10/1997 | Semmens et al. |
| 5,779,897 A | 7/1998 | Kalthod et al. |
| 5,792,391 A | 8/1998 | Vogel et al. |
| 5,826,432 A | 10/1998 | Ledbetter |
| 5,845,815 A | 12/1998 | Vogel |
| 5,882,717 A | 3/1999 | Panesar et al. |
| 5,980,959 A | 11/1999 | Fruitin |
| 6,041,970 A | 3/2000 | Vogel |
| 6,073,811 A | 6/2000 | Costea |
| 6,082,401 A | 7/2000 | Braun et al. |
| 6,092,811 A | 7/2000 | Bojarczuk et al. |
| 6,098,849 A | 8/2000 | McInnes |
| 6,138,995 A | 10/2000 | Page |
| 6,155,781 A | 12/2000 | Tsai |
| 6,167,718 B1 | 1/2001 | Halimi et al. |
| 6,209,855 B1 | 4/2001 | Glassford |
| 6,216,961 B1 | 4/2001 | Utter et al. |
| 6,235,641 B1 | 5/2001 | Christenson |
| 6,439,549 B1 | 8/2002 | Loov |
| 6,481,642 B1 | 11/2002 | Louis, Jr. et al. |
| 6,530,400 B2 | 3/2003 | Nelson |
| 6,688,019 B2 | 2/2004 | Buchweitz |
| 6,719,175 B2 | 4/2004 | MacKenzie |
| 6,749,090 B2 | 6/2004 | Bailey |
| 6,755,047 B2 | 6/2004 | Kreutzmann et al. |
| 6,869,081 B1 | 3/2005 | Jenco |
| 7,048,262 B2 | 5/2006 | Cheng |
| 7,073,688 B2 | 7/2006 | Choi et al. |
| 7,086,431 B2 | 8/2006 | D'Antonio et al. |
| 7,104,531 B2 | 9/2006 | Page et al. |
| 7,114,707 B2 | 10/2006 | Rona et al. |
| 7,255,353 B2 | 8/2007 | Caplain et al. |
| 7,267,247 B1 | 9/2007 | Crunkleton, III et al. |
| 7,361,164 B2 | 4/2008 | Simpson et al. |
| 7,407,154 B2 | 8/2008 | Sakakibara et al. |
| 7,487,888 B1 | 2/2009 | Pierre, Jr. |
| 7,520,925 B2 | 4/2009 | Sisk et al. |
| 7,533,786 B2 | 5/2009 | Woolfson et al. |
| 7,717,294 B2 | 5/2010 | Bodemann |
| 7,784,651 B2 | 8/2010 | Batschied et al. |
| 7,806,299 B2 | 10/2010 | Wauters |
| 8,024,870 B1 | 9/2011 | Ballentine et al. |
| 8,158,001 B2 | 4/2012 | Taylor et al. |

(56) References Cited

U.S. PATENT DOCUMENTS

| | | | |
|---|---|---|---|
| 8,348,245 B2 | 1/2013 | Fischer | |
| 8,356,422 B1 | 1/2013 | Ballentine et al. | |
| 8,397,627 B2 * | 3/2013 | Reyhanloo | A47J 31/4496 99/290 |
| 8,438,969 B2 | 5/2013 | Gold | |
| 8,544,688 B2 | 10/2013 | Ballentine | |
| 8,603,805 B2 | 12/2013 | Goodwin et al. | |
| 8,622,249 B1 | 1/2014 | Ballentine | |
| 8,840,092 B2 | 9/2014 | Kumar et al. | |
| 8,857,797 B2 | 10/2014 | Kumar et al. | |
| 8,882,084 B2 | 11/2014 | Malagi et al. | |
| 8,912,684 B2 | 12/2014 | Stahlkopf et al. | |
| 8,997,633 B2 | 4/2015 | Bishop et al. | |
| 9,107,449 B2 | 8/2015 | Njaastad et al. | |
| 9,114,368 B2 | 8/2015 | Njaastad et al. | |
| 9,339,056 B2 | 5/2016 | Njaastad | |
| 9,346,024 B2 | 5/2016 | Page et al. | |
| 9,386,782 B2 | 7/2016 | Choi et al. | |
| 9,497,978 B2 | 11/2016 | Choi et al. | |
| 9,623,383 B1 | 4/2017 | Kleinrichert | |
| 9,718,035 B2 | 8/2017 | Bandixen et al. | |
| 9,801,405 B2 | 10/2017 | Kleinrichert | |
| 10,017,373 B2 | 7/2018 | Kleinrichert | |
| 10,182,587 B2 | 1/2019 | Lundberg et al. | |
| 10,674,749 B2 * | 6/2020 | Lucas | B01F 3/04815 |
| 2002/0074369 A1 | 6/2002 | Forsman et al. | |
| 2003/0075573 A1 | 4/2003 | Bailey | |
| 2004/0045980 A1 | 3/2004 | Robins | |
| 2004/0112455 A1 | 6/2004 | Nelson | |
| 2004/0118942 A1 | 6/2004 | Courtney | |
| 2004/0244216 A1 | 12/2004 | Poole | |
| 2004/0262331 A1 | 12/2004 | Woolfson et al. | |
| 2005/0001340 A1 | 1/2005 | Page | |
| 2005/0251090 A1 | 11/2005 | Hoskins | |
| 2006/0016511 A1 | 1/2006 | Chantalat | |
| 2006/0112717 A1 | 6/2006 | Walton | |
| 2006/0163140 A1 | 7/2006 | Taylor et al. | |
| 2006/0270036 A1 | 11/2006 | Goodwin et al. | |
| 2007/0065555 A1 | 3/2007 | Soane et al. | |
| 2007/0090135 A1 | 4/2007 | Benham | |
| 2007/0158371 A1 | 7/2007 | Lupfer | |
| 2007/0261263 A1 | 11/2007 | Lee | |
| 2007/0278145 A1 | 12/2007 | Taylor et al. | |
| 2008/0148959 A1 | 6/2008 | Bockbrader | |
| 2008/0304356 A1 | 12/2008 | Zhuang | |
| 2009/0236361 A1 | 9/2009 | Doelman et al. | |
| 2010/0065584 A1 | 3/2010 | Berger | |
| 2010/0083843 A1 | 4/2010 | Denisart et al. | |
| 2010/0096040 A1 | 4/2010 | Litto | |
| 2010/0133708 A1 | 6/2010 | Fischer | |
| 2010/0203209 A1 | 8/2010 | Fishbein | |
| 2010/0213223 A1 | 8/2010 | Ballentine | |
| 2010/0218686 A1 | 8/2010 | O'Brien et al. | |
| 2011/0020508 A1 | 1/2011 | Santoiemmo | |
| 2011/0041543 A1 | 2/2011 | Tachibana et al. | |
| 2011/0097466 A1 | 4/2011 | Vastardis | |
| 2011/0113972 A1 | 5/2011 | Tatera | |
| 2011/0115103 A1 | 5/2011 | Tatera | |
| 2011/0180565 A1 | 7/2011 | Racino et al. | |
| 2011/0226343 A1 | 9/2011 | Novak et al. | |
| 2011/0300275 A1 | 12/2011 | Lackey et al. | |
| 2012/0038068 A1 | 2/2012 | Bormes et al. | |
| 2012/0098148 A1 | 4/2012 | Koslow et al. | |
| 2012/0177784 A1 | 7/2012 | Malagi et al. | |
| 2012/0292790 A1 | 11/2012 | Tatera | |
| 2013/0106690 A1 | 5/2013 | Lim | |
| 2013/0196031 A1 | 8/2013 | Criezis et al. | |
| 2013/0270722 A1 | 10/2013 | Phillips et al. | |
| 2014/0099405 A1 | 4/2014 | Boarman et al. | |
| 2014/0113045 A1 | 4/2014 | Njaastad et al. | |
| 2014/0220207 A1 | 8/2014 | Page | |
| 2014/0255574 A1 | 10/2014 | Njaastad et al. | |
| 2014/0302212 A1 | 10/2014 | Njaastad | |
| 2015/0329343 A1 | 11/2015 | Kleinrchert | |
| 2016/0136590 A1 | 5/2016 | Campbell | |
| 2016/0280528 A1 | 9/2016 | Kleinrichert | |
| 2016/0289617 A1 | 10/2016 | MacKenzie et al. | |
| 2017/0055552 A1 | 3/2017 | Giardino et al. | |
| 2017/0064977 A1 | 3/2017 | Bischel | |
| 2017/0164643 A1 | 6/2017 | Lundberg et al. | |
| 2017/0233235 A2 | 8/2017 | Kleinrichert | |
| 2017/0265499 A1 | 9/2017 | Hyde et al. | |
| 2017/0326508 A1 | 11/2017 | Bandixen et al. | |
| 2017/0367376 A1 | 12/2017 | Kleinrichert | |
| 2018/0098658 A1 | 4/2018 | Angell et al. | |
| 2018/0213824 A1 | 8/2018 | Schact et al. | |
| 2018/0282144 A1 | 10/2018 | Kleinrichert | |
| 2018/0362906 A1 | 12/2018 | Osborn | |

FOREIGN PATENT DOCUMENTS

| | | |
|---|---|---|
| CN | 2134366 | 5/1993 |
| CN | 1197029 | 10/1998 |
| CN | 1326380 | 12/2001 |
| CN | 1537028 | 10/2004 |
| CN | 1856687 | 11/2006 |
| CN | 103025644 | 4/2013 |
| CN | 203123868 | 8/2013 |
| CN | 103282304 | 9/2013 |
| CN | 104039431 | 9/2014 |
| DE | 20112974 | 9/2002 |
| DE | 602004003627 | 10/2007 |
| DE | 102008012486 | 9/2009 |
| DE | 102010012175 | 9/2011 |
| EP | 0132913 | 2/1988 |
| EP | 0470377 | 2/1992 |
| EP | 0732142 | 9/1996 |
| EP | 0745329 | 12/1996 |
| EP | 0873966 | 10/1998 |
| EP | 1092674 | 4/2001 |
| EP | 1480906 | 12/2004 |
| EP | 1480908 | 12/2004 |
| EP | 1662218 | 5/2006 |
| EP | 2070587 | 6/2009 |
| EP | 2719450 | 4/2014 |
| EP | 2571803 | 3/2017 |
| FR | 2684088 | 5/1993 |
| GB | 694918 | 7/1953 |
| GB | 2247225 | 2/1992 |
| GB | 2333282 | 7/1999 |
| GB | 2340415 | 2/2000 |
| GB | 2358145 | 7/2001 |
| GB | 2496010 | 5/2013 |
| GB | 2526735 | 2/2015 |
| KR | 20140035878 | 3/2014 |
| TW | 201446197 | 12/2014 |
| WO | WO 199529130 | 11/1995 |
| WO | WO 0187472 | 11/2001 |
| WO | WO 2003066509 | 12/2003 |
| WO | WO 2009026541 | 2/2009 |
| WO | WO 2009077681 | 6/2009 |
| WO | WO 2009077682 | 6/2009 |
| WO | WO 2011134926 | 11/2011 |
| WO | WO 2011134928 | 11/2011 |
| WO | WO 2012100333 | 8/2012 |
| WO | WO 2012162762 | 12/2012 |
| WO | WO 2014138667 | 9/2014 |
| WO | WO 2014183185 | 11/2014 |
| WO | WO 2015061564 | 4/2015 |
| WO | WO 2015075020 | 5/2015 |
| WO | WO 2015119204 | 8/2015 |
| WO | WO 2015124590 | 8/2015 |
| WO | WO 2015175244 | 11/2015 |
| WO | WO 2018023713 | 2/2018 |
| WO | WO 2018185581 | 10/2018 |

OTHER PUBLICATIONS iSi Twist 'N Sparkle Beverage Carbonating System YouTube video [online], isinorthamerica Mar. 23, 2011 [retrieved on Mar. 11, 2014] Retrieved from the Internet: <URL:www.youtube.com/watch?v=ySSXdwTs-cY>, (3 pages).

(56) References Cited

OTHER PUBLICATIONS

Kycon, Inc., KLDPX-0207-x-DC Power Jack, Panel Mount drawing, Jan. 18, 2008.
Mabuchi Motor Co. Ltd., RS-3855H Motor Mounting Drawings, PDF creation date of Aug. 19, 2008.
Perlini Carbonated Cocktail System YouTube video [online] Perlage Systems Jan. 11, 2010 [retrieved on Mar. 11, 2014] Retrieved from the Internet: <URL:www.youtube.com/watch?v=fhle9b4mjC48zfeature=relmfu>, (3 pages).
Rubesin, MW et al., "The Effect of Fluid Injection on the Compressible Turbulent Boundary Layer: Preliminary Tests on Transpiration Cooling of a Flat Plate at M=2.7 with Air as the Injected Gas", National Advisory Committee for Aeronautics, 1955.
Sodastream webpage [online], [retrieved on Oct. 8, 2012] Retrieved from the internet: <URL:www.sodastream.com/fizz/>, (1 page).
Sodastream, Video Demo [online], [retrieved on Mar. 11, 2014] Retrieved from the Internet: <URL:www.sodastreamusa.com/PopUps/VideoDemo.html>, (1 page).

\* cited by examiner

APPARATUSES, SYSTEMS, AND METHODS FOR INJECTING GASSES INTO BEVERAGES

CROSS-REFERENCE TO RELATED APPLICATIONS

The present disclosure is based on and claims priority to U.S. Provisional Patent Application No. 62/789,620, filed Jan. 8, 2019, and U.S. Provisional Patent Application No. 62/839,024, filed Apr. 26, 2019, the disclosures of which are incorporated by reference.

FIELD

The present disclosure relates to apparatuses, systems, and methods for injecting gasses into beverages.

BACKGROUND

The following U.S. patent application Publication and U.S. patent are incorporated herein by reference in entirety.

U.S. Patent Application Publication No. 2017/0055552 discloses a gas injection system for injecting a gas into a liquid. The system includes a flow channel that conveys a liquid from an upstream inlet that receives the liquid and a downstream outlet that dispenses the solution. A sparger is positioned in the flow channel, a solution pressure detection device senses the pressure of the solution in the flow channel, and a liquid valve regulates the flow of the liquid in the flow channel based on the pressure sensed by the solution pressure detection device. The sparger injects the gas into the liquid through the porous surface as the liquid flows across the surface.

U.S. Pat. No. 5,845,815 discloses a piston-based flow control for use in a high flow beverage dispensing valve. The piston includes a top perimeter edge structure that allows for continuity of fluid flow during high flow applications and particularly during the initiation of a high flow dispensing so as to eliminate chattering of the piston.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a beverage dispenser includes a gas system configured to collect ambient air, pressurize the ambient air, and dispense pressurized ambient air. The beverage dispenser includes a valve configured to dispense a base fluid and a concentrate system configured to dispense a concentrate. A manifold is configured to form a gas-injected mixed beverage comprising the base fluid, the concentrate, and the pressurized ambient air, and a nozzle is configured to apply a back-pressure upstream on the gas-injected mixed beverage and dispense the gas-injected mixed beverage.

In certain examples, a method for forming and dispensing a gas-injected mixed beverage with a beverage dispenser includes the steps of collecting, with a gas system, ambient air adjacent to the beverage dispenser, pressurizing, with a compressor, the ambient air, and dispensing the pressurized ambient air to the manifold. The method includes dispensing a base fluid to a manifold, dispensing a concentrate to the manifold, and mixing, in the manifold, the base fluid and the concentrate to thereby form a mixed beverage. The method further includes injecting, with an injector in the manifold, the pressurized ambient air into the mixed beverage to thereby form a gas-injected mixed beverage, applying, with a nozzle, a back-pressure on the gas-injected mixed beverage, and dispensing the gas-injected mixed beverage via the nozzle.

Various other features, objects, and advantages will be made apparent from the following description taken together with the drawings.

BRIEF DESCRIPTION OF THE DRAWINGS

The present disclosure includes the following Figures. The same numbers are used throughout the Figures to reference like features and like components.

DETAILED DESCRIPTION

Through research and experimentation, the present inventors have endeavored to develop improved systems for injecting gases into liquids to form gas-injected mixed beverages having preselected fluid ratios.

Figure 1:
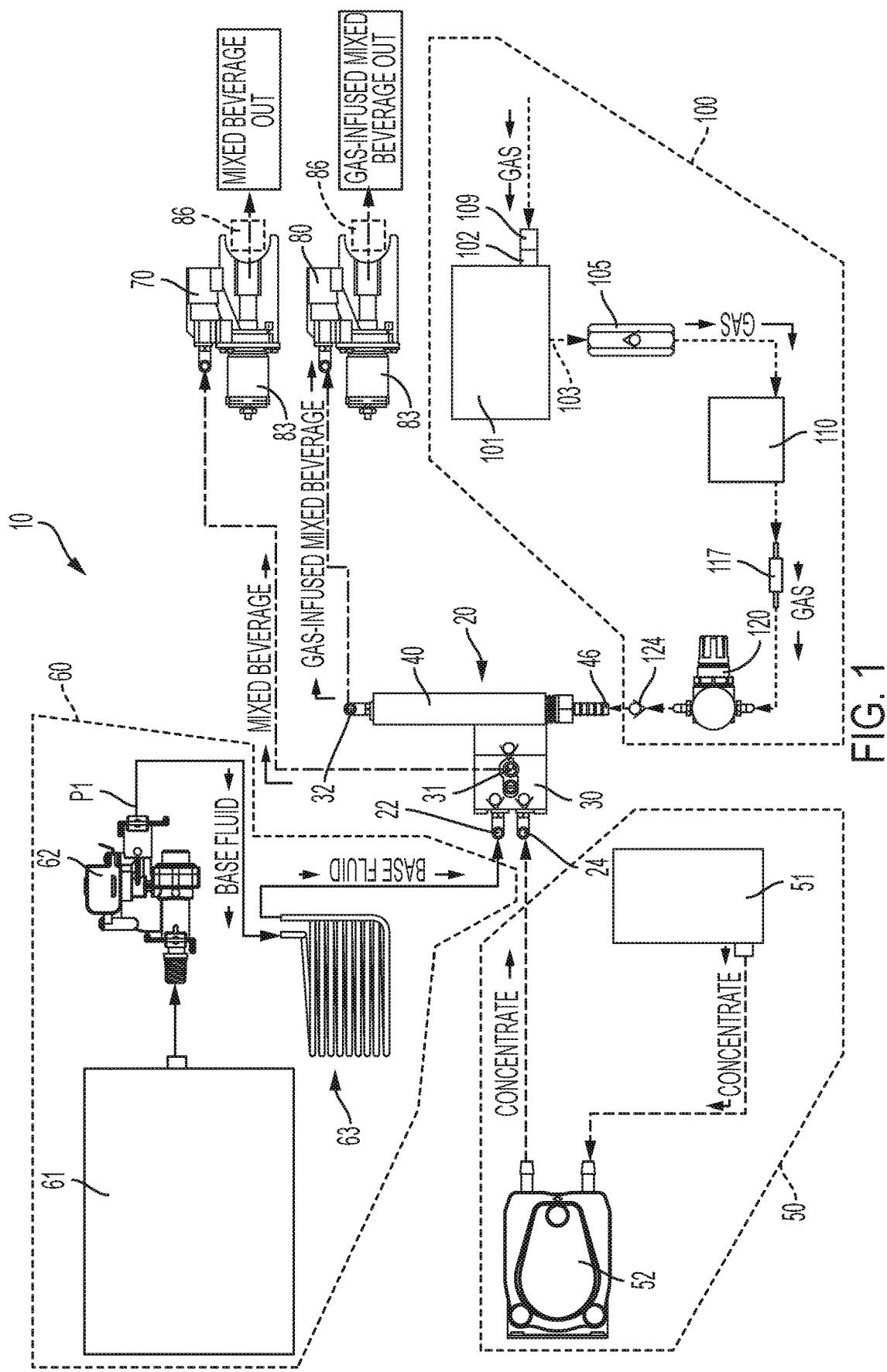
FIG. 1 is a schematic diagram of a beverage dispenser according to the present disclosure.

FIG. 1 is a schematic diagram of an example beverage dispenser 10 according to the present disclosure. Generally, the beverage dispenser 10 receives one or more liquids and one or more gasses, mixes the liquids together to form a mixed beverage, infuses or injects the gas or gasses into the mixed beverage to form a gas-injected mixed beverage, and dispenses the mixed beverage and/or the gas-injected mixed beverage to the operator.

Figure 2:
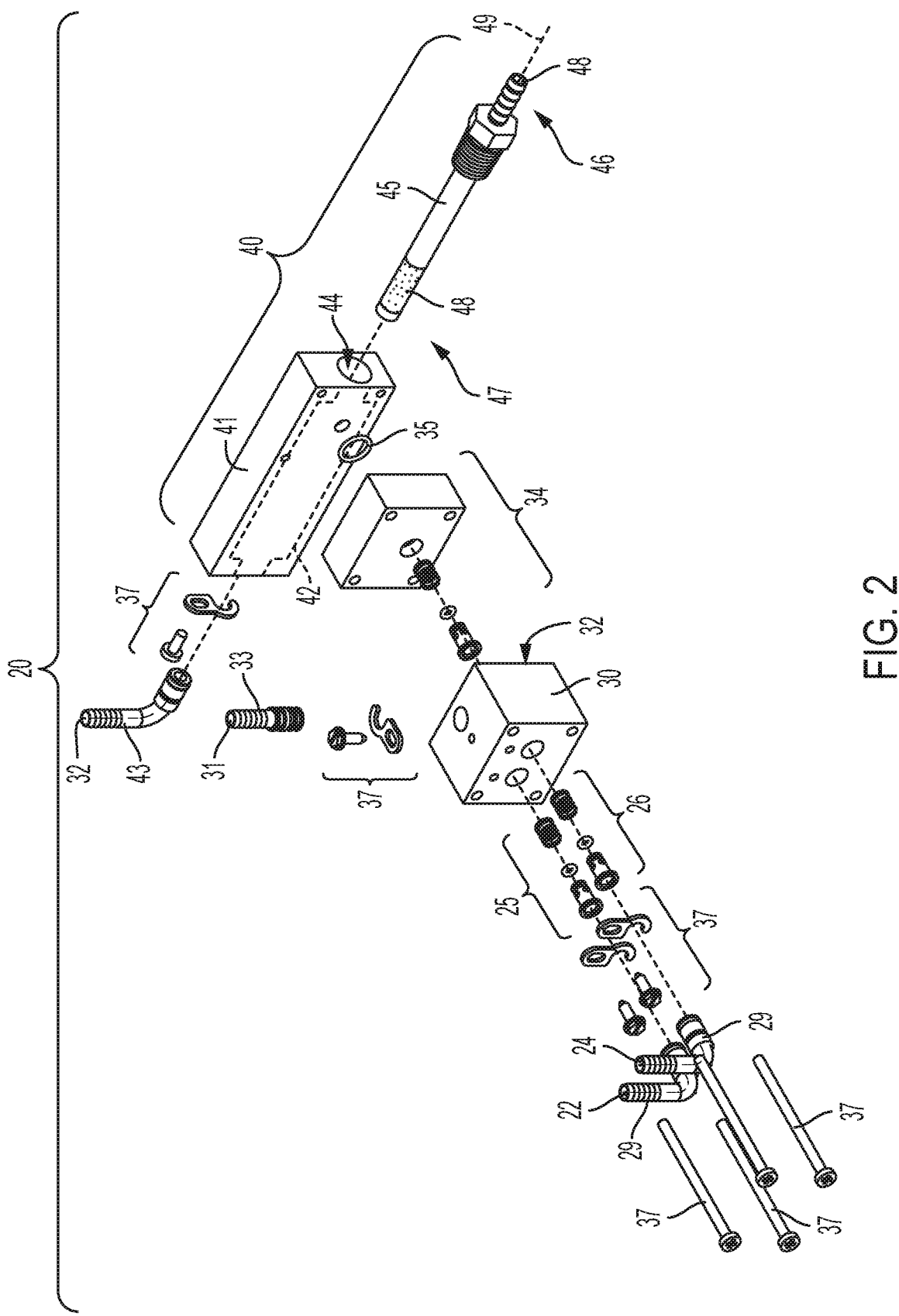
FIG. 2 is an exploded view of an example manifold.

Referring to FIG. 2, the beverage dispenser 10 includes a mixing and injecting manifold 20 for mixing one or more liquids to form the mixed beverage, injecting the gas or gasses into the mixed beverage, and dispensing the mixed beverage (without gas injected therein) and/or the gas-injected mixed beverage therefrom. Specifically, the manifold 20 includes a base fluid inlet 22 that receives a base fluid (e.g., still water) and a concentrate inlet 24 that receives a concentrate (e.g., coffee concentrate). The base fluid is conveyed downstream into a mixing chamber 30 in which the base fluid and the concentrate mix to form a mixed beverage (e.g., coffee). A first check valve 25 at the mixing chamber 30 prevents the mixed beverage from moving upstream to the base fluid inlet 22, and a second check valve 26 at the mixing chamber 30 prevents the mixed beverage from moving upstream to the concentrate inlet 24. Removable fittings 29 are provided at the base fluid inlet 22 and the concentrate inlet 24 and are removably connected to the mixing chamber 30.

After being formed in the mixing chamber 30, the mixed beverage is conveyed downstream along one of two separate flow paths based on the beverage selected by the operator. Specifically, when the operator desires the mixed beverage without gas (e.g., still coffee), the mixed beverage is conveyed downstream via a first outlet 31 to a first dispense assembly 70 (FIG. 1) (described further herein). A removable fitting 33 is provided at the first outlet 31 and is connected to the mixing chamber 30.

Alternatively, when the operator desires a gas-injected mixed beverage (e.g., nitrogen-injected coffee), the mixed beverage is conveyed downstream via a second outlet 32 to a check valve assembly 34, a gas injection device 40, and a second dispense assembly 80 (FIG. 1). The check valve assembly 34 prevents the gas-injected mixed beverage in the gas injection device 40 from being conveyed upstream into the mixing chamber 30. A gasket 35 is positioned between the check valve assembly 34 and the gas injection device 40 to create a fluid-tight seal therebetween. The mixing chamber 30, the check valve assembly 34, and the gas injection device 40 are coupled together with any suitable means, such as mechanical fasteners 37, adhesives, welding, and the like. In certain examples, the mixing chamber 30, the check valve assembly 34, and the gas injection device 40 are integrally formed with each other.

The gas injection device 40 has a body 41 with a chamber 42 (depicted in dashed lines) through which the gas-injected mixed beverage is conveyed to the second outlet 32. A removable fitting 43 is provided at the second outlet 32 and connected to the body 41. The body 41 also has a hole 44 through which an injector 45 (e.g., injecting device with an orifice, sparger) is received such that the injector 45 is in the chamber 42.

The injector 45 is for injecting or infusing a gas into the mixed beverage to thereby form the gas-injected mixed beverage (e.g., nitrogen-injected coffee) as the mixed beverage is conveyed through the gas injection device 40. The injector 45 extends along an axis 49 between a first end 46 that receives the gas and an opposite second end 47. In certain examples, the injector 45 includes at least one porous surface 48 through which the gas injects or infuses into the mixed beverage in the chamber 42. Specifically, the gas injects through the porous surface 48 and into the mixed beverage as the mixed beverage flows across the porous surface 48. That is, the mixed beverage is conveyed tangentially across the porous surface 48 and the gas injects transversely into the mixed beverage (e.g., the mixed beverage "scrubs" gas in the form of bubbles from the porous surface 48). The porous surface 48 can be formed of any suitable material having a plurality of pores, such as plastic (e.g., PTFE) or stainless steel expanded mesh. Reference is made to above-incorporated U.S. Patent Application Publication No. 2017/0055552 for details of a conventional gas injection device and injector.

As is noted above, the manifold 20 receives the base fluid, the concentrate, and the gas and thereby forms and dispenses the mixed beverage and the gas-injected mixed beverage to the dispense assemblies 70, 80, respectively. Specifically, the manifold 20 receives the concentrate from a concentrate system 50, the base fluid from a base fluid system 60, and the gas from a gas system 100 (FIG. 1). The dispense assemblies 70, 80 and systems 50, 60, 100 are described in greater detail hereinbelow.

Dispense Assemblies

As is briefly mentioned above, the first dispense assembly 70 is for receiving the mixed beverage from the first outlet 31 of the manifold 20 and dispensing the mixed beverage to the operator. Similarly, the second dispense assembly 80 is for receiving the gas-injected mixed beverage from the second outlet 32 of the manifold 20 and dispensing the gas-injected mixed beverage to the operator. The dispense assemblies 70, 80 are identical and are further described herein below with reference to the second dispense assembly 80 and FIGS. 3-4. The present inventors have also contemplated that in certain examples the first dispense assembly 70 may be different than the second dispense assembly 80 so that each dispense assembly 70, 80 accommodates the type of beverage dispensed therefrom as each beverage may have its own unique fluid characteristics (e.g., viscosity). In certain examples, the fluid characteristics of the mixed beverage may differ from the fluid characteristics of the gas-injected mixed beverage.

Figure 4:
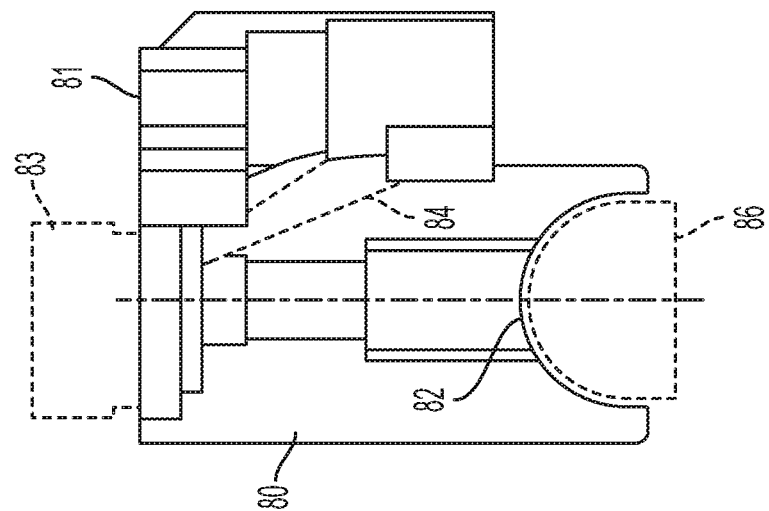
FIG. 4 is a top plan view of the dispense assembly of FIG. 3
Figure 3:
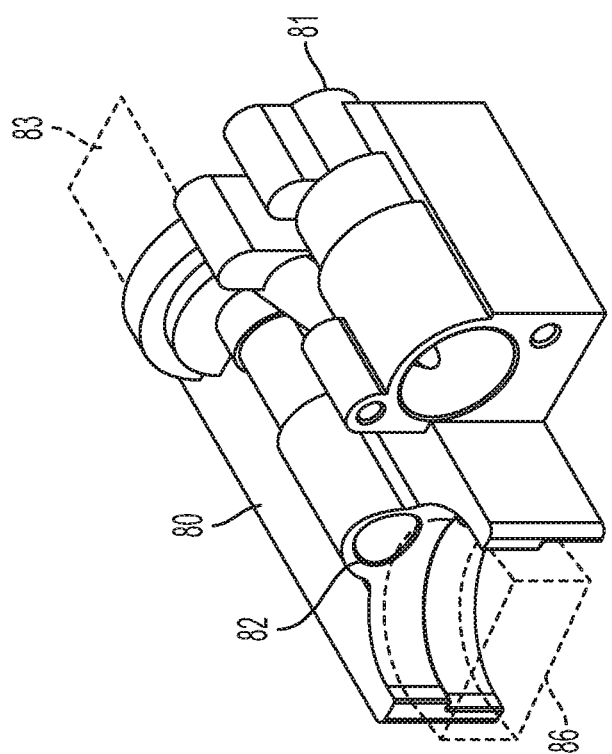
FIG. 3 is a perspective view of an example dispense assembly.

Referring to FIGS. 3-4, the second dispense assembly 80 includes an inlet 81 that receives the gas-injected mixed beverage from the manifold 20 and dispenses the gas-injected mixed beverage via a downstream outlet 82. The gas-injected mixed beverage is conveyed through flow channels 84 (FIG. 4) defined in the second dispense assembly 80 to the downstream outlet 82. In certain examples, a valve 83 is included for opening and closing one of the flow channels 84 to thereby selectively permit and prevent, respectively, the flow of the gas-injected mixed beverage through the second dispense assembly 80.

Figure 6:
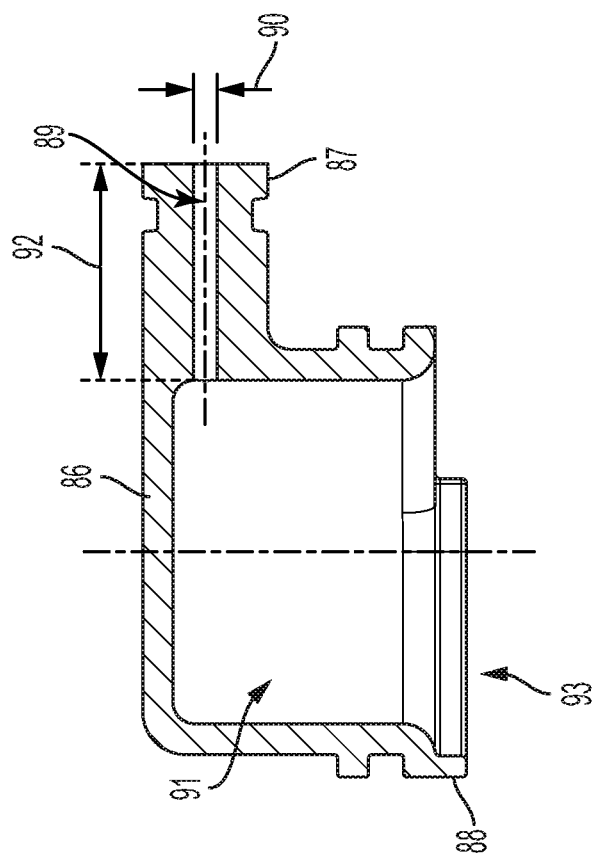
FIG. 6 is a cross-sectional view of the nozzle of FIG. 5 along line 6-6 in FIG. 5.
Figure 5:
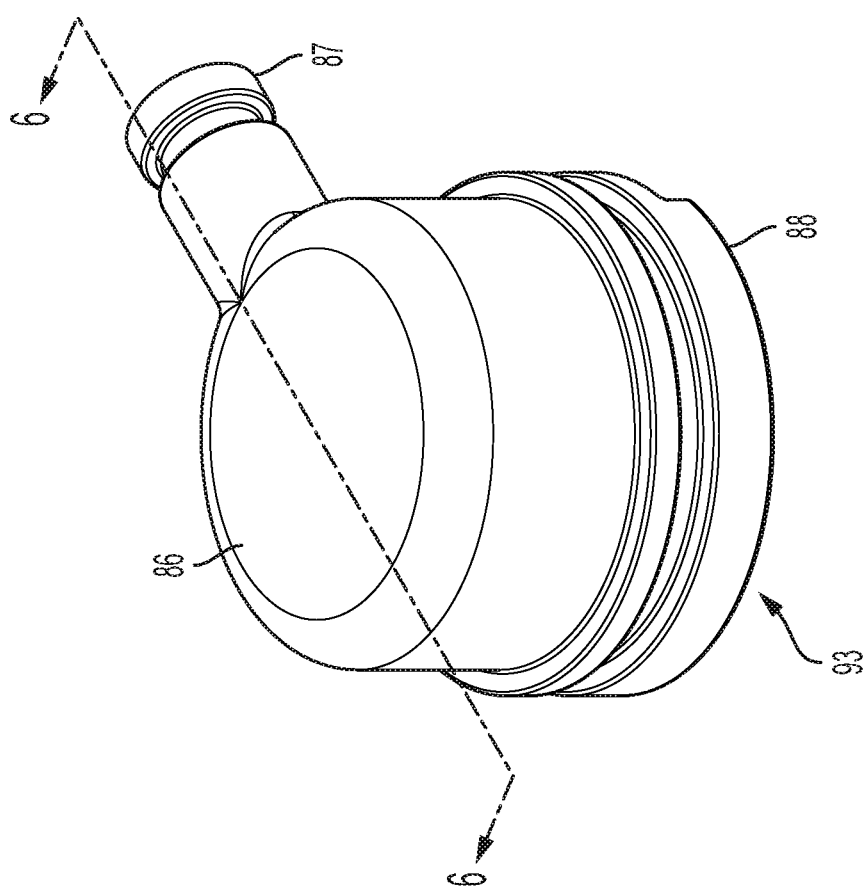
FIG. 5 is a perspective view of an example nozzle.

The gas-injected mixed beverage is conveyed through an outlet 82 to a nozzle 86 which is connected to the outlet 82 (the nozzle 86 is shown in dashed lines on FIGS. 3-4 and in greater detail on FIGS. 5-6). The nozzle 86 includes an upstream inlet end 87 that receives the gas-injected mixed beverage from the outlet 82 of the second dispense assembly 80 and a downstream outlet end 88 through which the gas-injected mixed beverage dispenses to the operator. The inlet end 88 has a bore 89 with a first diameter 90 and a first length 92 that extends to a cavity 91 into which the gas-injected mixed beverage is conveyed. As the gas-injected mixed beverage is conveyed through the bore 89 and the cavity 91, the pressure of the gas-injected mixed beverage rapidly decreases and is further conveyed by gravity through an opening 93 at the outlet end 88.

As the gas-injected mixed beverage is conveyed through the bore 89, back-pressure is applied upstream on the gas-injected mixed beverage in the manifold 20 (FIG. 1) such that the pressures and flow rates of the gas-injected mixed beverage and the gas remain constant. If the nozzle 86 did not apply the back-pressure, the inventors discovered that gas injection into the mixed beverage would be inconsistent and result in poor-quality beverages being dispensed. That is, absent the back-pressure applied on the gas-injected mixed beverage upstream of the nozzle 86 the flow rate of the gas-injected mixed beverage would not remain consistent with the flow rates of the base fluid and the concentrate. In addition, back-pressure from the first dispense assembly 70 is also applied upstream on mixed beverage in the mixing chamber 30. As such, both back-pressures (e.g., back-pressure from the first dispense assembly 70 and back-pressure from the second dispense assembly 80) maintains balance of the pressures in the beverage dispenser 10.

The length 92 and diameter 90 of the bore 89 can be adjusted to thereby vary the back-pressure applied upstream from the nozzle 86 and adjust the manner in which the gas-injected mixed beverage is dispensed from the nozzle 86. For example, the length 92 of the bore 89 can be made longer and/or the diameter 90 of the bore 89 made smaller to thereby increase the velocity at which the gas-injected mixed beverage is dispensed from the nozzle 86 and increase the pressure drop of the gas-injected mixed beverage through the nozzle 86. As such, the back-pressure applied upstream increases and the rate at which the gas in the gas-injected mixed beverage breaks out of solution increases. Increasing the rate at which the gas in the gas-injected mixed beverage breaks out of solution may advantageously increase the visual appearance of the gas-injected mixed beverage in the glass (e.g., the gas in the gas-injected mixed beverage quickly breaks out of solution causing foam and/or increased "cascading effect" of the gas in the glass) and/or adjust the "mouthfeel" of the gas-injected mixed beverage (e.g., varying levels of gas in the gas-injected mixed beverage can lead to different perceived levels of sweetness, smoothness, and/or creaminess).

Alternatively, making the length 92 of the bore 89 shorter and/or the diameter of the bore 89 larger would decrease the velocity at which the gas-injected mixed beverage is dispensed from the nozzle 86 and decrease the pressure drop of the gas-injected mixed beverage through the nozzle 86. As such, the back-pressure applied upstream decreases and the rate at which the gas in the gas-injected mixed beverage breaks out of solution decreases. A person of ordinary skill in the art will recognize that the nozzle 86 can be adjusted to thereby dispense the gas-injected mixed beverage. Decreasing the rate at which the gas breaks out of the gas-injected mixed beverage may advantageously change the visual appearance of the gas-injected mixed beverage (e.g., a longer period of time during which small amounts of gas in the gas-injected mixed beverage break out of solution) and/or adjust the taste of the gas-injected mixed beverage (e.g., more gas in the gas-injected mixed beverage causes the beverage to taste more "bubbly"). In one example, the length of the bore 89 is 0.630 inches and the diameter 90 of the bore 89 is 0.069 inches. The nozzle 86 is also interchangeable such that the operator can easily switch nozzles 86 and thereby change the back-pressure applied upstream based on specifications the gas-injected mixed beverage. For example, the back-pressure may be changed based on the flow rate of the gas-injected mixed beverage, the viscosity of the mixed beverage, the pressure of the gas, amounts of gas injected, fluid ratios, and/or rebalancing the beverage dispenser 10 to a new operating state. The present inventors have also contemplated that the nozzle 86 may be changed based on the type of gas-injected fixed beverage being dispensed. For example, the fluid properties (e.g., viscosity, temperature) of the gas-injected mixed beverage may change as the base fluid and/or the gas used to form the gas-injected mixed beverage are changed (e.g. a soda syrup concentrate is substituted with a juice concentrate). In these examples, the nozzle 86 is changed such that the gas-injected mixed beverage is dispensed with the desired characteristics. Furthermore, the present inventors have contemplated that the size of the bore 89 could be automatically adjusted with a valve device (not shown) to thereby adjust the back-pressure applied upstream and maintain proper dispense characteristics of the gas-injected mixed beverage. The valve device may be controlled by a controller 200 (FIG. 11) which receives input from pressure sensors 230 that sense the pressure of the gas-injected mixed beverage. As such, the size of the bore 89 can be adjusted such that the gas-injected mixed beverage is dispensed with the correct dispense characteristics and specifications.

Concentrate System

Referring back to FIG. 1, the concentrate system 50 includes a concentrate source 51 (e.g., bag-in-box concentrate container, concentrate tank) connected via fluid lines or pipes to a pump 52 that conveys the concentrate from the concentrate source 51 to the concentrate inlet 24 of the manifold 20. The pump 52 is a variable speed pump configured to pump the concentrate at a constant flow rate (e.g., 0.2 ounces per second). The operation of the pump 52 can also be controlled or changed to account for different flow ratios of the mixed beverage formed (e.g., 4:1, 7:1). In certain examples, the pump 52 can be further configured to maintain a constant flow rate of the concentrate conveyed to the concentrate inlet 24 of the manifold 20 regardless of the pressure downstream in the beverage dispenser 10. The pump 52 can be any suitable type of pump (e.g., positive displacement pump, peristaltic pump, DC motor, AT motor, gearbox). In addition, the pump 52 can act as a control for flow or ratio of the mixed beverage while other variables (e.g., back-pressure, flow rate, water pressure, etc.) remain constant and the variable speed of pump 52 creates accurate ratio control.

Base Fluid System

The base fluid system 60 includes a base fluid source 61 (e.g., building water supply, pressurized tank) connected via fluid lines or pipe to a valve 62. The present inventors have recognized that the beverage dispenser 10 may be installed into different applications such that the flow rate and the pressure of the base fluid received by the valve 62 may vary. As such, the present inventors have discovered that the valve 62 should preferably be configured to dispense the base fluid at a preselected flow rate and a preselected pressure P1 regardless of the flow rate and the pressure of the base fluid received into the valve 62. Accordingly, the beverage dispenser 10 of the present disclosure advantageously can be installed in many different locations. For example, the pressure of the base fluid received into the valve 62 may be in the range of 35.0-90.0 pounds per square inch (PSI), and in one example, the valve 62 is configured to dispense the base fluid at a constant pressure of 29.0 PSI (+/−1.0 PSI). Note that the pressure of the base fluid dispensed from the valve 62 can vary to any pressure in the range of 15.0-89.0 PSI (e.g., 20.0 PSI, 30.0 PSI, 31.0 PSI, 32.0 PSI, 45.0 PSI, 75.0 PSI).

In certain examples, the valve 62 is similar to a solenoid valve and is capable of controlling pressure and flow rate. The valve 62 is preconfigured to dispense the base fluid at a predetermined pressure regardless of the back-pressure or the pressure of the base fluid at the base fluid inlet 22. In addition, the valve 62 is configured to dispense the base fluid at the preselected flow rate based on the size of a controlling orifice within the valve 62. The preselected flow rate is maintained by the valve 62 regardless of the pressure (including back-pressure) acting on the mixed beverage downstream from the valve 62. Accordingly, the valve 62 also acts as a flow control device for controlling the amount of base fluid dispensed to the base fluid inlet 22 of the manifold 20. The present inventors have found that controlling the flow rate of the base fluid (with the valve 62) and the flow rate of the concentrate (with the pump 52) upstream of the gas injection device 40 increases the efficiency and the effectiveness of the gas injection device 40 and produces consistent gas-injected mixed beverages when compared to conventional beverage dispensers.

The present inventors have discovered that absent control of the flow rate and the pressure of the base fluid (and the concentrate) upstream of the gas injection device 40, the pressure at which the gas must be injected into the mixed beverage to form the gas-injected mixed beverage may need to be significantly higher (relative to the pressure of the gas used in the beverage dispenser 10 of the present disclosure). For example, the pressure of the gas used in the beverage dispenser 10 of the present disclosure is 29.0 PSI while the pressure of the gas in conventional beverage dispensers may be upwards of 120.0 PSI. Accordingly, by reducing the pressure of the gas needed in the beverage dispenser 10 the size (e.g., footprint) of the beverage dispenser 10 and the gas system 100 (described herein) can be significantly reduced.

The valve 62 can further be configured to close thereby preventing the flow of the base fluid and creating a water "hammer" downstream. As such, the pressure of the base fluid and/or the mixed beverage downstream from the valve 62 is maintained at a constant pressure and does not deteriorate (e.g. the gas injected in the gas-injected mixed beverage does not "break out" of solution). Furthermore, the valve 62 prevents pressure "leakage" downstream that may occur when conventional valves or regulators are used. That is, the present inventors have recognized that conventional valves or regulators may "leak" pressure downstream even if the valve or regulator is closed. The "leaked" pressure increases the pressure of the base fluid downstream from the valve 62 such that the gas is not properly injected into the base fluid and/or the base fluid "chokes" or prevents the flow of the gas. As such, the present inventors have discovered that is certain examples it is advantageous to use a valve 62 that does not "leak" pressure.

Figure 12:
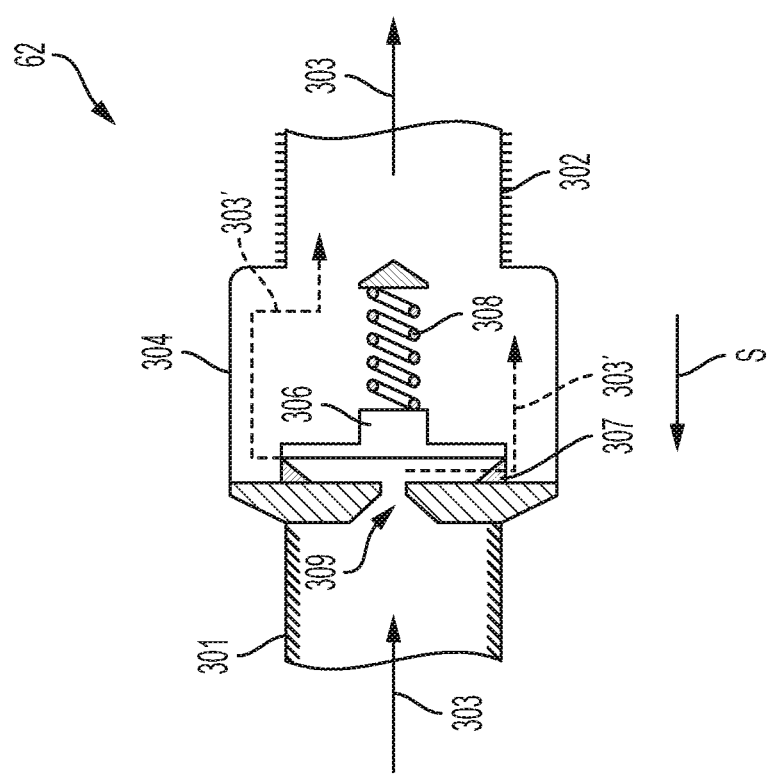
FIG. 12 is a cross-sectional view of an example valve.

FIG. 12 depicts an example valve 62 that may be used in the base fluid system 60 (FIG. 1). The valve 62 has a threaded inlet end 301 that receives the base fluid 303 and a body 304 through which the base fluid 303 is conveyed to an outlet end 302 that dispenses the base fluid 303. A diaphragm 306 is in the body 304 and is biased onto a seat 307 by a spring 308 such that the diaphragm 306 is in a closed position (FIG. 12). In the closed position, the diaphragm 306 covers an inlet hole 309 to thereby prevent the base fluid 303 from being conveyed through the valve 62. The spring 308 applies a spring force (see arrow S) on the diaphragm 306, and the spring force can be changed to thereby adjust an operating pressure of the valve 62. The operating pressure is a pressure of the base fluid 303 that overcomes the spring force applied by the spring 308 such that the diaphragm 306 is moved by the base fluid 303 to an open position (not shown). In the open position, the diaphragm 306 is spaced apart from the seat 307 and the base fluid 303 is conveyed through the valve 62.

As the base fluid 303 is conveyed through the valve 62 (see dashed lines 303'), the base fluid 303 passes through the inlet hole 309 such that the pressure of the base fluid 303 decreases. Specifically, the diameter of the inlet hole 309 is relatively smaller than the diameter of the inlet end 301 and accordingly, the pressure of the base fluid 303 decreases as the base fluid 303 is conveyed through the inlet hole 309. The diameter of the inlet hole 309 is fixed, and therefore, the base fluid 303 is conveyed through the valve 62 at a constant flow rate. Any increase to the pressure of the base fluid 303 above the operating pressure (e.g., +30.0 PSI above the operating pressure, +70.0 PSI above the operating pressure) does not affect the pressure and the flow rate of the base fluid dispensed from the outlet end 302 due to the orientation of the diaphragm 306 relative to the inlet hole 309, the fixed size of the inlet hole 309, and/or the spring force of the spring 308.

The diaphragm 306 returns to the closed position (FIG. 12) and the valve 62 is closed when the pressure of the base fluid 303 upstream of the inlet hole 309 falls below the operating pressure. As such, the spring 308 pushes the diaphragm 306 into contact with the seat 307 to thereby close the valve 62. In certain examples, the valve 62 is self-cleaning. An example of a conventional valve that may be used in the base fluid system 60 is available from Gate CFV, Inc. (Model #CFIVE.29PSI.FKM.WF).

In certain examples, the valve 62 can be adjusted by the operator to change the pressure and the flow rate at which the base fluid is dispensed from the valve 62 to thereby fine-tune the beverage dispenser 10 to specific applications and mixed beverages.

In certain examples, as shown in FIG. 1, the base fluid is conveyed first to a refrigeration system 63 (e.g., ice bank cooler) prior to being conveyed to the base fluid inlet 22 of the manifold 20. The refrigeration system 63 is configured to cool the base fluid to a preselected temperature. The refrigeration system 63 can include any suitable type of refrigeration components such as compressors, evaporators, and cooling coils. The base fluid is then further conveyed downstream to the base fluid inlet 22 of the manifold 20.

Gas System

The present inventors have observed that conventional beverage dispensers often utilize a pressurized nitrogen source to inject a gas with a high percentage of nitrogen (88.0% to 100.0% of nitrogen), e.g., high-purity nitrogen gas, into a beverage. High-purity nitrogen gas is supplied to conventional beverage dispensers from large high-pressure tanks and/or from nitrogen gas generators or scrubbers. In the instance of a conventional nitrogen gas generator, high-pressure mixed gas is supplied to the generator and the high-pressure mixed gas is subjected to large pressure drops to thereby separate the nitrogen gas from the other gases in the mixed gas. As such, high-purity nitrogen gas is generated. In another example, the high-pressure mixed gas is forced through membranes such that the nitrogen gas is separated from the other gases in the mixed gas. The present inventors have recognized that is advantageous to eliminate high-pressure components from beverage dispensers (e.g., high-pressure tanks, nitrogen gas generators) to thereby decrease the footprint of the beverage dispenser and lower the cost of the beverage dispenser. The present inventors have also recognized, through research and experimentation, that ambient air contains a sufficiently high amount of desired air molecules (e.g. nitrogen (N2), oxygen (O2)) and ambient air can be injected into the mixed beverage to produce high-quality gas-injected mixed beverages. For example, ambient air usually contains 70.0-80.0% nitrogen mixed with oxygen, argon, carbon dioxide, and other gasses. The present inventors have recognized that the differences in mixed beverage quality between mixed beverages injected with a gas having a high percentage of nitrogen and mixed beverages injected with ambient air may be negligible to consumers. Furthermore, the present inventors have recognized that the ambient air surrounding or adjacent to the beverage dispenser 10 of the present disclosure when installed can be can be collected by the beverage dispenser and injected into the mixed beverage. As such, the beverage dispenser 10 of the present disclosure has been designed to exclude burdensome, bulky, and expensive equipment (e.g., pressurized gas tank of high-percentage nitrogen) that are used in conventional beverage dispensers. Accordingly, the size of the beverage dispenser 10 of the present disclosure can be significantly reduced relative to conventional beverage dispensers. Furthermore, high-pressure gas tanks and systems can be dangerous to unskilled operators as the beverage dispensers are operated, maintained, and/or replaced. For example, if the high-pressure system leaks gas the breathable air in a room may be displaced out of the room thereby causing a potential health hazard to person(s) in the room. As such, it is advantageous to remove the high-pressure tanks and systems to improve the safety of the beverage dispenser. A person of ordinary skill in the art will recognize that even though the term 'gas' is used herein above and below to describe certain components, systems, and products of the beverage dispenser 10, a mixed gas comprising multiple gasses or ambient air can be used with the components and systems of the beverage dispenser 10 and to form the mixed beverages dispensed therefrom.

Figure 7:
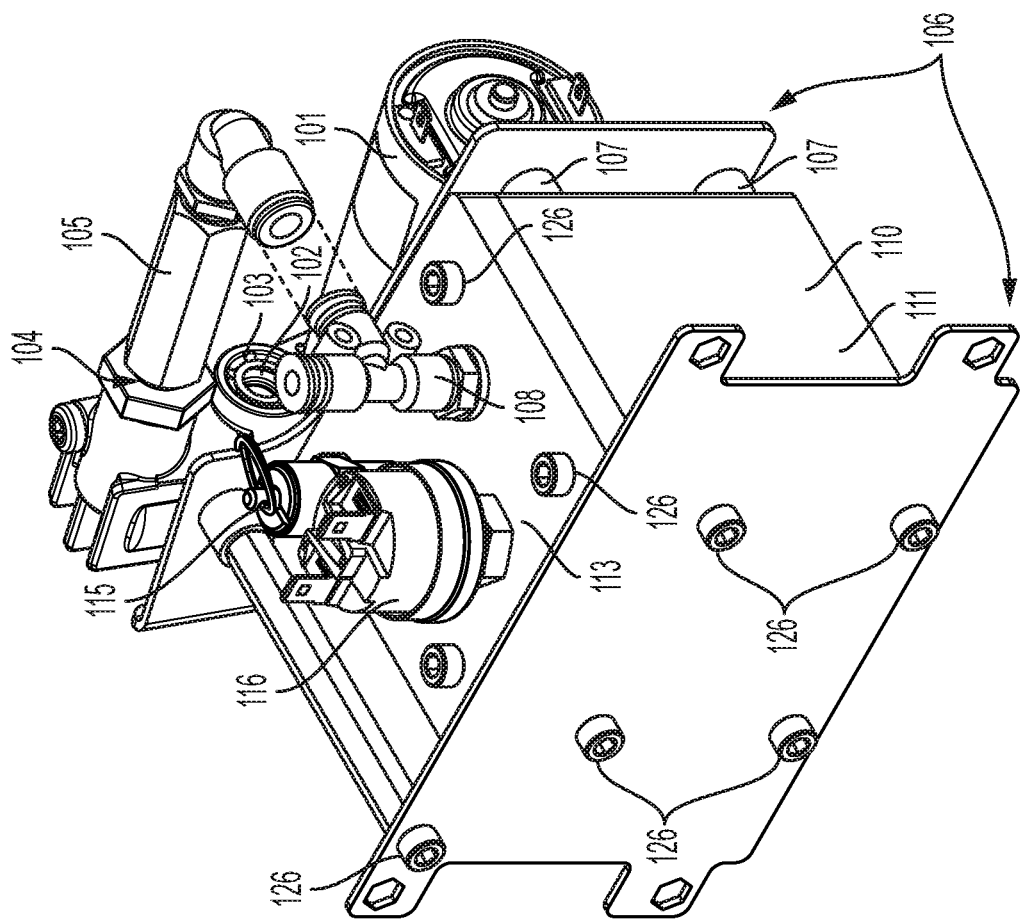
FIG. 7 is a perspective view of a portion of an example gas system.
Figure 8:
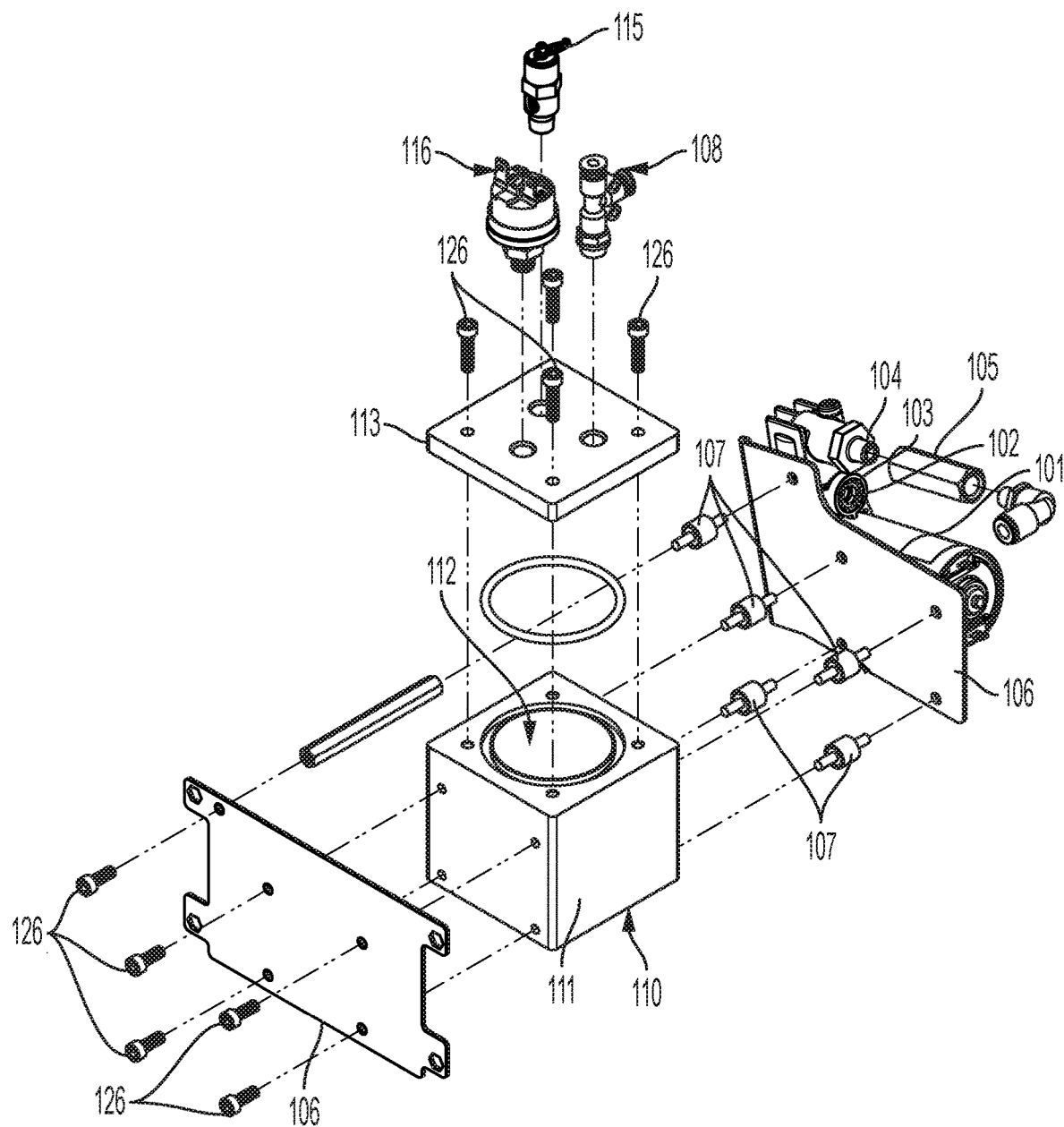
FIG. 8 is an exploded view of what is shown in FIG. 7.

Referring to FIGS. 1 and 7-8, the gas system 100 includes a compressor 101 with a gas inlet 102 for receiving or collecting gas, such as ambient air from the area surrounding the beverage dispenser 10, and an outlet 104 for dispensing gas downstream. Any suitable compressor may be used, and an example conventional compressor is available from GD-Thomas (135 series WOB-L compressors). In other examples, the compressor 101 may receive a mixed gas comprising a mixture of gases that closely match ambient air from a mixed air supply system or container.

The compressor 101 has a filter 109 positioned at the gas inlet 102 to remove dirt or particles in the gas (e.g., ambient air) before the gas enters the compressor 101. The compressor 101 dispenses the gas through a compressor outlet 104, a check valve 105, and a T-fitting 108 (FIG. 7) to a gas storage device 110 (described herein). The check valve 105 prevents the gas stored in the gas storage device 110 from moving upstream into the compressor 101. As such, the frequency of duty cycles of the compressor 101 can be significantly reduced (the pressurized gas in the gas system 100 does not back up into the compressor 101 or cause leaks at the compressor 101). The T-fitting 108 (FIG. 7) receives the gas and dispenses the gas to either the gas storage device 110 or downstream toward the manifold 20 (FIG. 1) (described further herein). In certain examples, the gas storage device 110 is made from aluminum and acts as a heat-sink for the gas contained therein.

Figure 10:
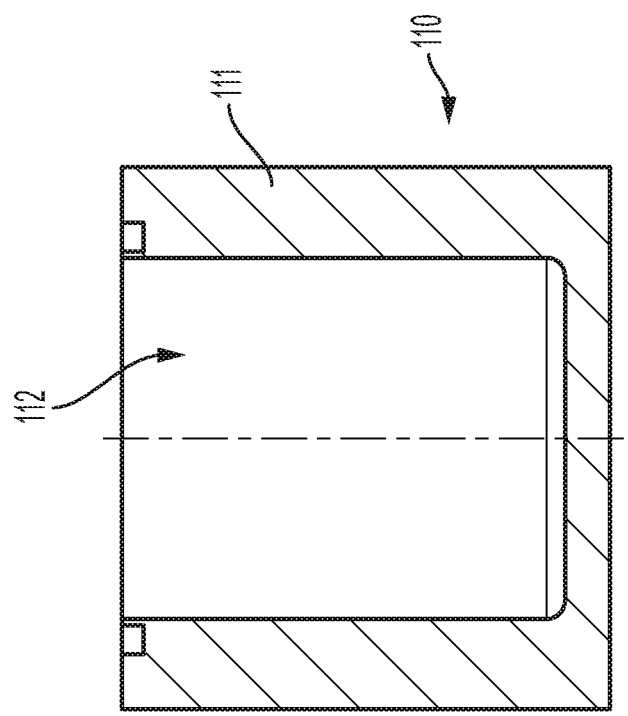
FIG. 10 is a cross-sectional view of the housing of FIG. 9 along line 10-10 in FIG. 9.
Figure 9:
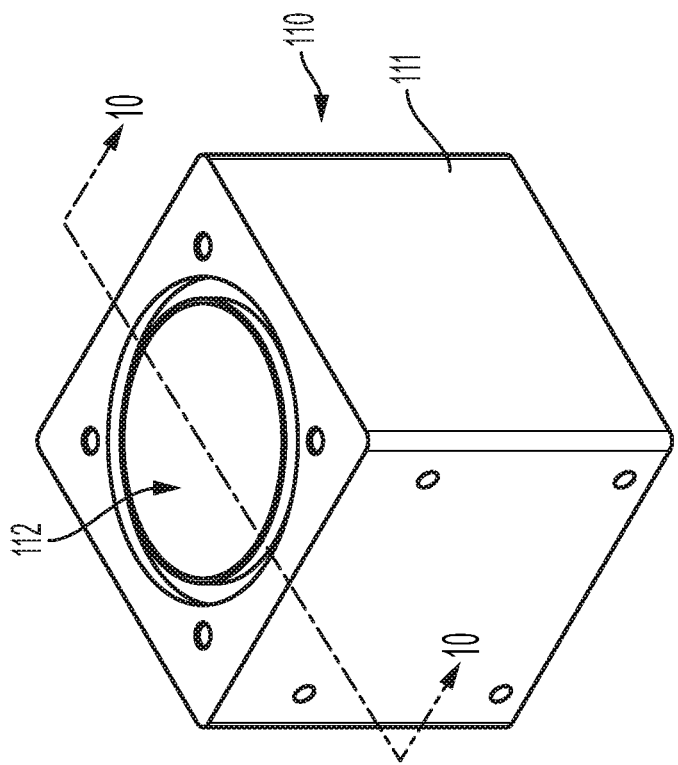
FIG. 9 is a perspective view of an example housing of a gas storage device.

Referring to FIGS. 9-10, several components of the gas system 100 are shown in greater detail. The gas storage device 110 includes a housing 111 with a top plate 113 and a chamber 112 in which the gas from the compressor 101 is stored. The compressor 101 is connected to a mounting bracket 106 with isolation couplers 107 that minimize vibration transfer, and the mounting bracket 106 is connected to the gas storage device 110. The various components of the gas system 100 are coupled together with any suitable means, such as mechanical fasteners 126, adhesives, welding, and the like.

The chamber 112 is advantageously sized to contain a volume of gas that is needed to inject gas into three to four mixed beverages. In other examples, the chamber 112 is sized to contain a predetermined volume of gag needed to inject into more than four mixed beverages. By limiting the size the chamber 112 and amount the chamber 112 holds, the compressor 101 need only operate and increase the pressure of the gas in the chamber 112 when the pressure of the gas falls to a predetermined lower-pressure limit (e.g., 60.0 PSI). In certain examples, infrequent operation of the compressor 101 reduces the amount of heat generated by the compressor 101 in comparison to compressors that operate frequently. As such, the compressor 101 and other associated components of the gas system 100 are not subjected to increased temperatures and thus increasing the lifespan of the compressor 101 and other associated components. During operation the beverage dispenser 10, injection of the gas into the mixed beverage in the manifold 20 causes the pressure of the gas in the chamber 112 to incrementally decrease. The compressor 101 does not turn-on or energize until the pressure of the gas in the chamber 112 decreases to the predetermined lower-pressure limit (e.g., 60.0 PSI). As such, the compressor 101 is not continuously operating and the effective duty cycle of the compressor is relatively small (<1.0% duty cycle) when compared to other compressors in conventional beverage dispensers which operate more frequently or continuously. Accordingly, the compressor 101 provides increased energy savings, noise reduction, and longevity when compared to conventional compressors in conventional dispensers. The volume of the chamber 112 can vary, and in one example, the volume of the chamber 112 is 7.2 cubic inches. The gas system 100 also includes a pressure switch 116 and a pressure relief valve 115 in communication with the chamber 112. An example of a conventional pressure switch is available from Sensata (25PS series), and an example conventional pressure relief valve is available from Conrader (model #SRV187). In certain examples, the pressure switch 116 provides an "on" signal when the pressure in the chamber 112 is less than the predetermined lower-pressure limit or an "off" signal when the pressure in the chamber 112 is at or greater than the predetermined upper-pressure limit. When the "on" signal is provided to the compressor 101, the compressor 101 activates to thereby increase the pressure of the gas in the chamber 112. In other examples, the pressure switch 116 and/or a pressure sensor (not shown) provides input signals to a controller 200 (FIG. 11) that controls the compressor 101.

As the gas in the chamber 112 is conveyed downstream toward the manifold 20 via the T-fitting 108, the gas is conveyed through a secondary filter 117. The secondary filter 117 removes particles and/or bacteria from the gas, and the secondary filter 117 can be rated to any particle size, such as 2.0 microns, 1.0 micron, 0.1 microns, and the like. After passing through the secondary filter 117, the gas is received into a gas regulator 120 that controls and regulates the gas to a predetermined gas pressure. For example, the gas regulator 120 fully adjustable (e.g., the gas regulator 120 can be adjusted in the range of 0.0-60.0 PSI) is configured to regulate and control the pressure of the gas dispensed therefrom. In certain examples, the pressure of the gas is controlled and regulated to 29.0 PSI (+/−1.0 PSI). In other examples, the pressure of the gas is controlled and regulated to closely match the pressure of the concentrate, the pressure of the base fluid, and/or the pressure of the mixed beverage in the chamber 42 of the gas injection device 40 (FIG. 2). In still other examples, the pressure of the gas is controlled and regulated to a pressure that is different than (e.g., greater than, less than) the pressure of the concentrate, the pressure of the base fluid, and/or the pressure of the mixed beverage. Once received into the injector 45, the gas is then injected through the porous surface 48 of the injector 45 into the mixed beverage in the chamber 42 of the gas injection device 40. The gas is conveyed through a check valve 124 before being received into the first end 46 of the injector 45 (FIG. 2). The check valve 124 prevents the mixed beverage from being conveyed from the gas injection device 40 (FIG. 2) upstream into the gas regulator 120 and the gas system 100. An example of a conventional gas regulator that can be utilized in the gas system 100 is manufactured by Parker (model #R344-02K001). In certain examples, the gas system 100 also included a moisture control device (not shown) configured to remove moisture from the gas. The present inventors have also contemplated that additional scavenging devices or membranes can be affixed to the gas inlet 102 of the compressor 101 to thereby increase the amount of desired air molecules that are drawn in by the compressor 101 (e.g. a nitrogen scavenging machine may increase the nitrogen in the gas drawn by the compressor 101 to 85.0%).

In certain examples, the gas system 100 is configured to provide a mixed gas formed from two or more gases to the manifold 20 (FIG. 1). The gases that may be mixed together to form the mixed gas include, but are not limited to, oxygen, argon, helium, carbon dioxide, nitrogen, and nitrous oxide. The gases to be mixed together may be selected by the operator such that different gas-injected mixed beverage can be formed (e.g., a soda beverage with a mixed gas formed to include 75.0% carbon dioxide and 25.0% nitrogen). In one example, the mixed gas includes ambient air mixed with additional carbon dioxide gas. In another example, the mixed gas includes ambient air combined with additional nitrogen gas.

Control System

Figure 11:
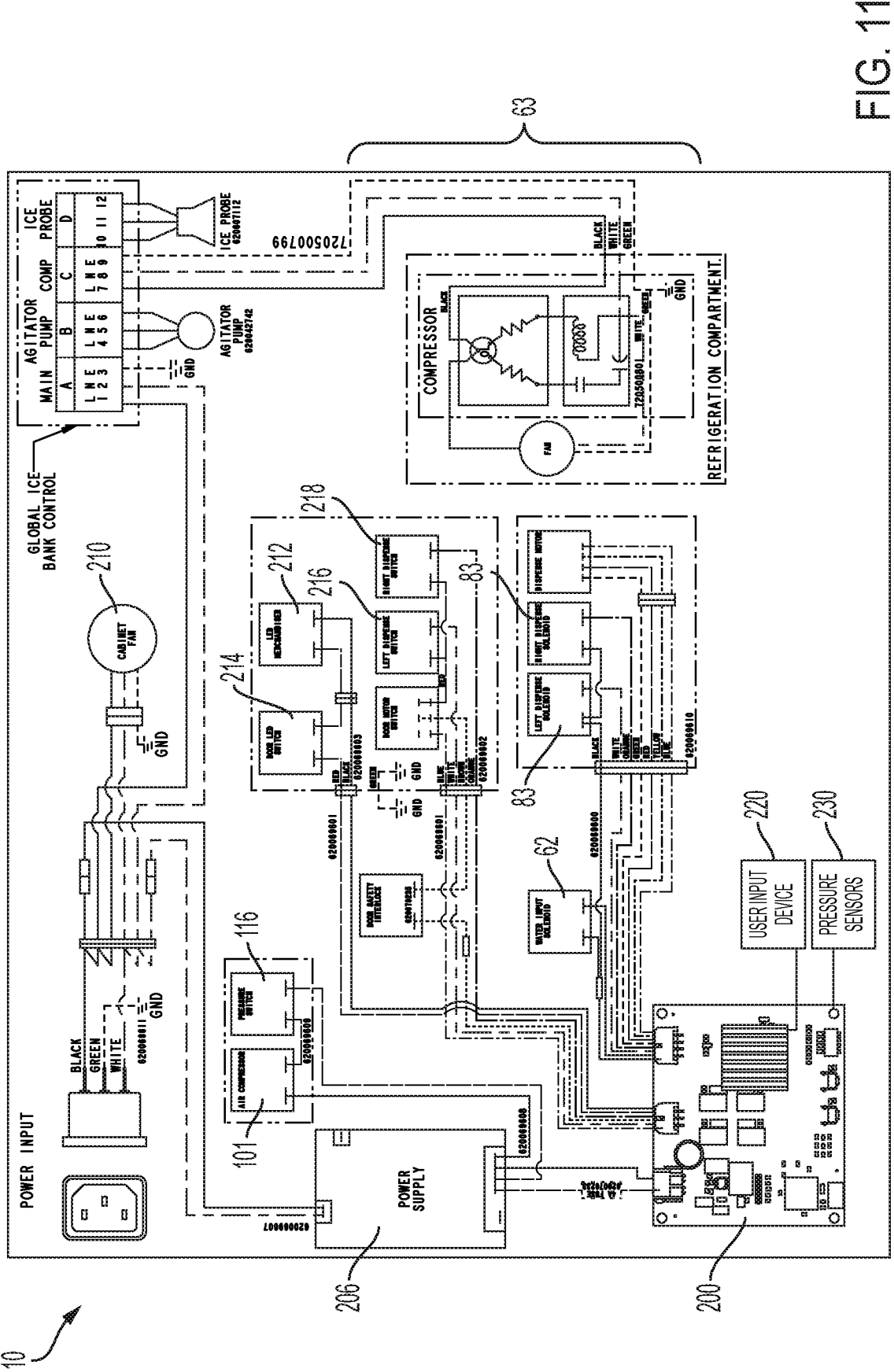
FIG. 11 is an electrical schematic diagram of an example beverage dispenser of the present disclosure.

Referring now to FIG. 11, the beverage dispenser 10 includes a computer controller 200 in communication with the various components and systems described above and configured to control these components and systems, as described hereinbelow. The components of the beverage dispenser 10 are in communication with the computer controller 200 via wired or wireless communication links, and the computer controller 200 includes a processor (not shown) and a memory (not shown). The computer controller 200 can be located anywhere in the beverage dispenser 10 and/or located remote from the beverage dispenser 10 and can communicate with various components of the beverage dispenser 10 via networks, peripheral interfaces, and wired and/or wireless links. The computer controller 200 may include a computing system that includes a processing system, storage system, software, and input/output (I/O) interfaces for communicating with peripheral devices.

The computer controller 200 is connected to a power supply 206 which supplies power to the computer controller 200 and/or other components of the beverage dispenser 10. The computer controller 200 is in communication with the valve 62, each valve 83 at the dispense assemblies 70, 80 (FIG. 1), and the refrigeration system 63. The computer controller 200 is also in communication with other components of the beverage dispenser 10 including lights (LEDs) 212, door switches 214, dispensing switches 216, 218 at the dispense assemblies 70, 80, and a user input device 220 for receiving user inputs. A cabinet fan 210 can be provided to circulate air in the beverage dispenser 10. The first dispensing switch 216 is associated with the first dispense assembly 70, and the second dispensing switch 218 is associated with the second dispense assembly 80. In certain examples, the dispensing switch 216, 218 is a single pole, single throw momentary on/off switch such that a tap handle (not shown) is actuated once the dispensing switch 216, 218 will send a signal to the computer controller 200 and the mixed beverage will be dispensed through the correct nozzle 86. In certain examples, one or pressure sensors 230 are included to sense pressure of the gas, the base fluid, the mixed beverage, and/or the gas-injected mixed beverage. The pressure sensors provide inputs to the computer controller 200 such that the computer controller 200 can control other components of the beverage dispenser 10. For example, if a pressure sensor 230 senses that the pressure of the gas-injected mixed beverage downstream from the manifold 20 (FIG. 1) is less than a predetermined pressure necessary for proper dispense of the gas-injected mixed beverage the computer controller 200 may control an adjustable component of the dispense assembly 80 (e.g., an adjustable restrictor) to thereby increase the back-pressure applied on the gas-injected mixed beverage.

As is noted above, the computer controller 200 is configured to control components of the beverage dispenser 10 such that the beverage selected by the operator, e.g. mixed beverage without gas or gas-injected mixed beverage, is dispensed.

During operation of the beverage dispenser 10, the pressure of the gas stored in the gas storage device 110 (FIG. 1) is maintained within a predetermined range (e.g., 60.0-80.0 PSI) and the predetermined range may vary based on the beverage dispenser 10 and the fluid and/or gases used. In particular, the pressure switch 116 causes the compressor 101 to actuate when the pressure in the gas storage device 110 falls to the predetermined lower-pressure limit. Accordingly, the compressor 101 increases the pressure of the gas storage device 110 to a predetermined upper-pressure limit until the pressure switch 116 senses the predetermined upper-pressure limit and causes the compressor 101 to turn off. In certain examples, the beverage dispenser 10 includes one or more pressure sensors 230 (FIG. 11) that sense the pressure of the gas in the gas storage device 110 (FIG. 1) as the gas-injected mixed beverage is dispensed. Based on the sensed pressure the computer controller 200 operates the compressor 101 as the gas-injected mixed beverage is dispensed to maintain the gas supplies to the gas injection device 40 (FIG. 2) above an operating pressure and continue to operate the compressor 101 after the gas-injected mixed beverage stops dispensing until the pressure of the gas in the gas storage device 110 is at a desired storage pressure, which may be equal to or greater than the operating pressure).

At the same time, the computer controller 200 controls the base fluid system 60 (FIG. 1) and the concentrate system 50 (FIG. 1) to accurately dispense the base fluid and the concentrate to the manifold 20 (FIG. 1). In particular, the computer controller 200 controls the valve 62 such that the flow rate of the base fluid remains constant and the pump 52 (FIG. 1) such that the flow rate of the concentrate remains constant, which may require the pump 52 to increase or reduce the speed at which it pumps. In certain examples, the pump 52 is controlled by the computer controller 200 to thereby vary the flow rate of the concentrate and change the fluid ratio of the mixed beverage (e.g., the flow rate of the concentrate can be changed such that fluid ratio can be varied to a fluid ratio in a range of 1:1-40:1).

In one specific example, the beverage dispenser 10 may be set up to dispense a mixed beverage or a gas-injected mixed beverage with a 5:1 fluid ratio at a flow rate of 1.2 oz/sec and a predetermined pressure for the base fluid, the concentrate, and the gas of 29.0 PSI+/−1.0 PSI (described above; see FIG. 1). During dispense, the valve 62 dispenses 1.0 oz/sec of base fluid at 29.0 PSI+/−1.0 PSI to the base fluid inlet 22 of the manifold 20 (FIG. 1) and the pump 52 pumps the concentrate to the concentrate inlet 24 of the manifold 20 (FIG. 1) at 0.2 oz/sec. As noted above, the computer controller 200 also controls the pressure of the gas such that the gas regulator 120 (FIG. 1) dispenses gas to the injector 45 at a pressure of 29.0 PSI+/−1.0 PSI. Accordingly, the pressure of the base fluid and the gas are equivalent (+/−1.0 PSI tolerance) and the mixed beverage or gas-injected mixed beverage can be dispensed from the dispense assemblies 70, 80 with the desired fluid ratio (5:1) and amount of gas. When the beverage dispenser 10 is not dispensing the mixed beverage or the gas-injected mixed beverage, the pressures of the base fluid, the concentrate, and the gas are held at or near 29.0 PSI (+/−1.0 PSI) such that the mixed beverage or gas-injected mixed beverage can be dispensed immediately. In certain examples, the gas regulator 120 can be manually adjusted such that the pressure of the gas is greater than 29.0 PSI which increases the amount of gas or nitrogen in the mixed beverage. In another example, the beverage dispenser 10 can be configured to dispense a beverage with a fluid ratio in the range of 2:1-11:1. To change the flow ratio, the flow rate of the base fluid is adjusted to maintain a 1.0 ounce per second flow rate while pressure of the base fluid and the concentrate are reduced. As such, the gas is injected into the mixed beverage at a higher pressure.

In other examples, the pressures of the base fluid, the concentrate, the mixed beverage, and/or the gas may differ relative to each other such that the characteristics and/or composition of the gas-injected mixed beverage can be selectively varied. In a non-limiting example, the pressure of the gas may be greater than the pressure of the mixed beverage such that additional amounts of gas are injected into the mixed beverage thereby forming a high-gas content gas-injected mixed beverage which may exhibit unique characteristics when dispensed into the glass. In this example, the gas may more quickly break out of solution, cause additional foam, and/or increase the "cascading effect" of the gas in the glass.

In certain examples, a method for forming and dispensing a gas-injected mixed beverage with a beverage dispenser includes the steps of: collecting, with a gas system, ambient air adjacent the beverage dispenser; pressurizing, with a compressor, the ambient air; dispensing a base fluid to a manifold; dispensing a concentrate to the manifold; mixing, in the manifold, the base fluid and the concentrate to thereby form a mixed beverage; dispensing pressurized ambient air to the manifold; injecting, with an injector in the manifold, the pressurized ambient air into the mixed beverage to thereby form a gas-injected mixed beverage; applying, with a nozzle, a back-pressure on the gas-injected mixed beverage; and dispensing the gas-injected mixed beverage via the nozzle. In certain examples, the method further includes storing the pressurized ambient air in a gas storage device before dispensing of the pressurized ambient air to a manifold and decreasing, with a gas regulator, the pressure of the pressurized ambient air before dispensing the pressurized ambient air to the manifold. In certain examples, the pressure of the base fluid dispensing to the manifold, the pressure of the concentrate dispensing to the manifold, and the pressure of the pressurized ambient air dispensing to the manifold are each equal to a predetermined pressure. In certain examples, the predetermined pressure is in the range of 28.0-30.0 pounds per square inch. In certain examples, the method further includes decreasing, with a valve, pressure of the base fluid dispensing to the manifold to match the pressure of the pressurized ambient air dispensing to the manifold.

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

What is claimed is:

1. A beverage dispenser comprising:
    a gas system configured to collect ambient air, pressurize the ambient air, and dispense pressurized ambient air;
    a valve configured to dispense a base fluid;
    a concentrate system configured to dispense a concentrate;
    a manifold configured to form a gas-injected mixed beverage comprising the base fluid, the concentrate, and the pressurized ambient air; and
    a nozzle configured to apply a back-pressure upstream on the gas-injected mixed beverage and dispense the gas-injected mixed beverage.

2. The beverage dispenser according to claim 1, wherein the manifold is further configured to mix the base fluid and the concentrate to form a mixed beverage, and wherein the manifold has an injector through which the pressurized ambient air injects into the mixed beverage to form the gas-injected mixed beverage.

3. The beverage dispenser according to claim 2, wherein the injector is a sparger.

4. The beverage dispenser according to claim 2, wherein the gas system has a compressor configured to pressurize the ambient air and a gas storage device configured to store the pressurized ambient air before the pressurized ambient air is dispensed from the gas system to thereby reduce duty cycle of the compressor.

5. The beverage dispenser according to claim 4, wherein the gas system has a gas regulator downstream from the gas storage device configured to decrease pressure of the pressurized ambient air before the pressurized ambient air is dispensed from the gas system.

6. The beverage dispenser according to claim 5, wherein pressure of the base fluid dispensed from the valve, pressure of the concentrate dispensed from the concentrate system, and the pressure of the pressurized ambient air dispensed from the gas system are each equal to a predetermined pressure.

7. The beverage dispenser according to claim 6, wherein the predetermined pressure is in the range of 20.0-35.0 pounds per square inch.

8. The beverage dispenser according to claim 7, wherein the predetermined pressure is in the range of 28.0-30.0 pounds per square inch.

9. The beverage dispenser according to claim 5, wherein the pressure of the pressurized ambient air dispensed from the gas system differs from pressure of the mixed beverage formed in the manifold.

10. The beverage dispenser according to claim 9, wherein the pressure of the pressurized ambient air is greater than the pressure of the mixed beverage.

11. The beverage dispenser according to claim 2, wherein the valve is configured to decrease the pressure of the base fluid dispensed therefrom to match the pressure of the pressurized ambient air dispensed from the gas system.

12. The beverage dispenser according to claim 11, wherein the valve has:
    an inlet end configured to receive the base fluid, wherein the inlet end has an inlet hole;
    a channel through which the base fluid is conveyed;
    a diaphragm in the channel biased toward the inlet end; and
    an outlet end configured to dispense the base fluid;
    wherein when the inlet end receives the base fluid having a pressure less than a threshold pressure the diaphragm covers the inlet hole and thereby prevents the base fluid from conveying through the valve; and wherein when the inlet end receives the base fluid having a greater than or equal to the threshold pressure the diaphragm is moved away from the inlet hole by the base fluid such that the diaphragm is spaced apart from the inlet hole and the base fluid dispenses from the outlet end.

13. The beverage dispenser according to claim 12, wherein the valve has a spring in the channel that applies a spring force on the diaphragm to thereby bias the diaphragm toward the inlet end, and wherein the spring is adjustable to change the spring force applied on the diaphragm and thereby change the threshold pressure.

14. The beverage dispenser according to claim 13, wherein increasing the spring force applied on the diaphragm increases the threshold pressure.

15. A beverage dispenser comprising:
    a gas system configured to collect ambient air, pressurize the ambient air, and dispense pressurized ambient air, the gas system has:
        a compressor configured to pressurize the ambient air;
        a gas storage device configured to store the pressurized ambient air before the pressurized ambient air is dispensed from the gas system to thereby reduce duty cycle of the compressor; and
        a gas regulator downstream from the gas storage device and configured to decrease pressure of the pressurized ambient air before the pressurized ambient air is dispensed from the gas system;
    a valve configured to dispense a base fluid;
    a concentrate system configured to dispense a concentrate;
    a manifold configured to mix the based fluid and the concentrate to form a mixed beverage and further inject the pressurized ambient air into the mixed beverage to thereby form a gas-injected mixed beverage, wherein the manifold has an injector through which the pressurized ambient air injects into the mixed beverage; and
    a nozzle configured to apply a back-pressure upstream on the gas-injected mixed beverage and dispense the gas-injected mixed beverage.

16. The beverage dispenser according to claim 15, wherein the valve has:
    an inlet end configured to receive the base fluid, wherein the inlet end has an inlet hole;
    a channel through which the base fluid conveys;
    a diaphragm in the channel biased toward the inlet end; and
    an outlet end configured to dispense the base fluid;
    wherein when the pressure of the base fluid received by the inlet end is less than a threshold pressure the diaphragm covers the inlet hole and thereby prevents the base fluid from conveying through the valve; and
    wherein when the pressure of the base fluid received by the inlet end is greater than or equal to the threshold pressure the diaphragm is moved away from the inlet hole by the base fluid such that the diaphragm is spaced apart from the inlet hole and the base fluid dispenses from the outlet end.

17. The beverage dispenser according to claim 16, wherein the valve has a spring in the channel that applies a spring force on the diaphragm to thereby bias the diaphragm toward the inlet end, and wherein the spring is adjustable to change the spring force applied on the diaphragm and thereby change the threshold pressure.

18. A method for forming and dispensing a gas-injected mixed beverage with a beverage dispenser, the method comprising:
    collecting, with a gas system, ambient air adjacent the beverage dispenser;
    pressurizing, with a compressor, the ambient air;
    dispensing a base fluid to a manifold;
    dispensing a concentrate to the manifold;
    mixing, in the manifold, the base fluid and the concentrate to thereby form a mixed beverage;
    dispensing the pressurized ambient air to the manifold;
    injecting, with an injector in the manifold, the pressurized ambient air into the mixed beverage to thereby form a gas-injected mixed beverage;
    applying, with a nozzle, a back-pressure on the gas-injected mixed beverage; and
    dispensing the gas-injected mixed beverage via the nozzle.

19. The method according to claim 18, further comprising:
    storing the pressurized ambient air in a gas storage device before dispensing of the pressurized ambient air to a manifold.

20. The method according to claim 19, further comprising:
    decreasing, with a gas regulator, the pressure of the pressurized ambient air before dispensing the pressurized ambient air to the manifold.

21. The method according to claim 20, further comprising:
    decreasing, with a valve, pressure of the base fluid dispensing to the manifold to match the pressure of the pressurized ambient air dispensing to the manifold.

* * * * *